(12) United States Patent
Carmon et al.

(10) Patent No.: US 8,559,345 B2
(45) Date of Patent: Oct. 15, 2013

(54) ESTABLISHING COLOCATED SECOND CELL USING A SECOND SCRAMBLING CODE BY A FEMTO BASE STATION

(75) Inventors: Rafy Carmon, Le Zion (IL); Amir Appel, Kfar-Saba (IL); Stephen Whittaker, Berkshire (GB); Alan Carter, Swindon (GB)

(73) Assignees: Percello Ltd., Raanana (IL); Ubiquisys Limited, Swindon (GB)

( * ) Notice: Subject to any disclaimer, the term of this patent is extended or adjusted under 35 U.S.C. 154(b) by 188 days.

(21) Appl. No.: 13/056,278

(22) PCT Filed: Jul. 23, 2009

(86) PCT No.: PCT/GB2009/050916
§ 371 (c)(1),
(2), (4) Date: Mar. 11, 2011

(87) PCT Pub. No.: WO2010/013032
PCT Pub. Date: Feb. 4, 2010

(65) Prior Publication Data
US 2011/0194534 A1    Aug. 11, 2011

(30) Foreign Application Priority Data
Jul. 31, 2008   (GB) .................................. 0814055.0

(51) Int. Cl.
*H04B 7/00*          (2006.01)
(52) U.S. Cl.
USPC ........................................ 370/310.2; 370/328
(58) Field of Classification Search
USPC .................. 370/349, 310.2, 328, 332, 338
See application file for complete search history.

(56) References Cited

U.S. PATENT DOCUMENTS

| | | | |
|---|---|---|---|
| 7,835,740 B2 * | 11/2010 | Claussen et al. | ........... 455/435.1 |
| 2007/0071075 A1 | 3/2007 | Yang et al. | |
| 2007/0097939 A1 | 5/2007 | Nylander et al. | |
| 2009/0163216 A1 * | 6/2009 | Hoang et al. | .................. 455/450 |

FOREIGN PATENT DOCUMENTS

| | | |
|---|---|---|
| EP | 1657950 | 5/2006 |
| EP | 1777974 | 4/2007 |
| GB | 2447439 | 9/2008 |
| WO | WO 2007/015066 | 2/2007 |
| WO | WO 2008/088592 | 7/2008 |

OTHER PUBLICATIONS

United Kingdom Second Examination Report dated Aug. 1, 2012, Application No. GB0814055.0.

(Continued)

*Primary Examiner* — Brenda H Pham
(74) *Attorney, Agent, or Firm* — Weaver Austin Villeneuve & Sampson LLP

(57) ABSTRACT

In a cellular communications network, it may be desirable for a large number of basestations to share one or a small number of scrambling codes. When a basestation identifies a desired scrambling code, which is also being used by another nearby basestation, steps are taken such that a location area update is triggered whenever a mobile communications device moves from a coverage area of the nearby basestation into a coverage area of said basestation. Further, the basestation establishes a first cell, using the desired scrambling code, and also establishes a second cell also served by the basestation, using a second scrambling code. By ensuring that mobile devices are preferentially served by the second cell, the possibility of interference with the nearby basestation is reduced.

25 Claims, 2 Drawing Sheets

(56) References Cited

OTHER PUBLICATIONS

United Kingdom First Examination Report dated Jan. 30, 2012, Application No. GB0814055.0.

PCT International Search Report and Written Opinion dated Nov. 26, 2009 issued in PCT/GB2009/050916.

UK Intellectual Property Office Search Report dated Nov. 10, 2008 issued in GB0814055.0.

* cited by examiner

ESTABLISHING COLOCATED SECOND CELL USING A SECOND SCRAMBLING CODE BY A FEMTO BASE STATION

CROSS-REFERENCE TO RELATED APPLICATIONS

This application is a national stage filing under 35 U.S.C. 371 of International Application PCT/GB2009/050916, filed on Jul. 23, 2009, which claims priority from GB Application No. 0814055.0, filed Jul. 31, 2008. Each of these applications is incorporated herein by reference in its entirety and for all purposes.

This invention relates to a cellular communication system, and in particular to a cellular basestation and a method of operation thereof, and more specifically to a method of operation of the cellular basestation even where there are limited numbers of suitable scrambling codes.

It is known to provide a cellular basestation that provides coverage for a small area, for example within a home or small office, for a relatively small number of registered users, using the existing broadband internet connection to the premises to connect in to the mobile network operator's core network. This is commonly referred to as a femtocell basestation or Home NodeB.

WO2007/015066 discloses a self-configuring cellular basestation, which receives a permitted list of carriers and scrambling codes from a management system, and selects one of the carriers and scrambling codes on the basis of measurements made on signals received from other surrounding basestations. Specifically, WO2007/015066 discloses that the self-configuring cellular basestation should select the carrier and scrambling code combination that it receives with minimum received power.

In some situations, the mobile network operator may allocate only a small number of scrambling codes for use by all of the deployed femtocell basestations, and in fact it is possible that there may be only one scrambling code allocated for use by all of the femtocell basestations in an operator's network, and so there is a possibility that two femtocell basestations that are located very close together may need to use the same scrambling code.

The present invention relates to a method for reducing the possibility of interference between these femtocell basestations in this situation.

According to a first aspect of the present invention, there is provided method, for use in a basestation of a cellular communications network, the method comprising:
identifying a desired scrambling code for use by the basestation, the desired scrambling code also being used by another nearby basestation;
using the desired scrambling code in a first cell served by the basestation; and
establishing a second cell also served by the basestation, using a second scrambling code.

According to a second aspect of the invention, there is provided a basestation adapted to perform the method of the first aspect.

For a better understanding of the present invention, and to show how it may be put into effect, reference will now be made, by way of example, to the accompanying drawings, in which:—

Figure 1:
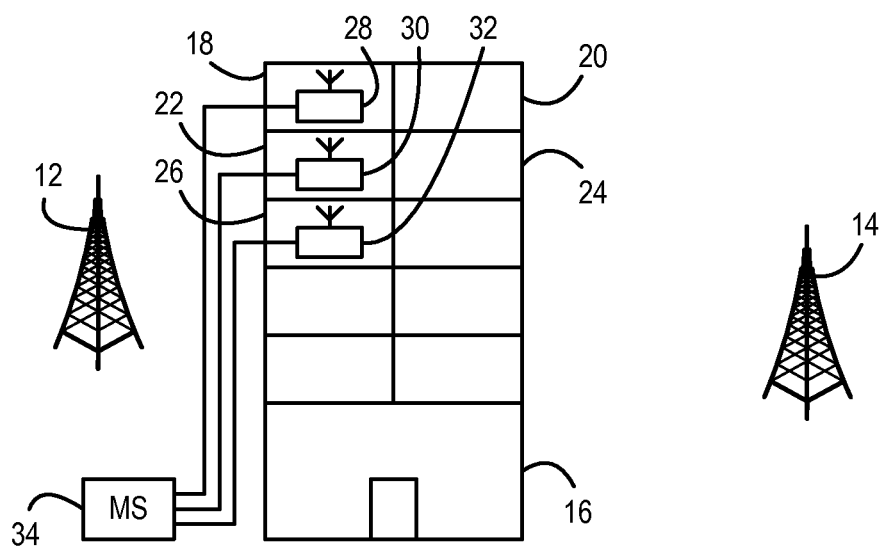
FIG. 1 is a schematic representation of a part of a cellular communications network in accordance with an aspect of the present invention.

FIG. 1 is a schematic representation of a part of a cellular communications network. The part of the network shown in FIG. 1 contains two basestations 12, 14, each of which serves a relatively wide geographical area, or cell. These relatively large cells are referred to as macrocells, and the basestations that serve macrocells are together referred to as the macrocell network. As is conventional, the basestations 12, 14 are connected in to the core network owned by the mobile network operator. As is also conventional, a user equipment within the network coverage area can receive signals from, and transmit signals to, one or more of the basestations 12, 14.

Figure 2:
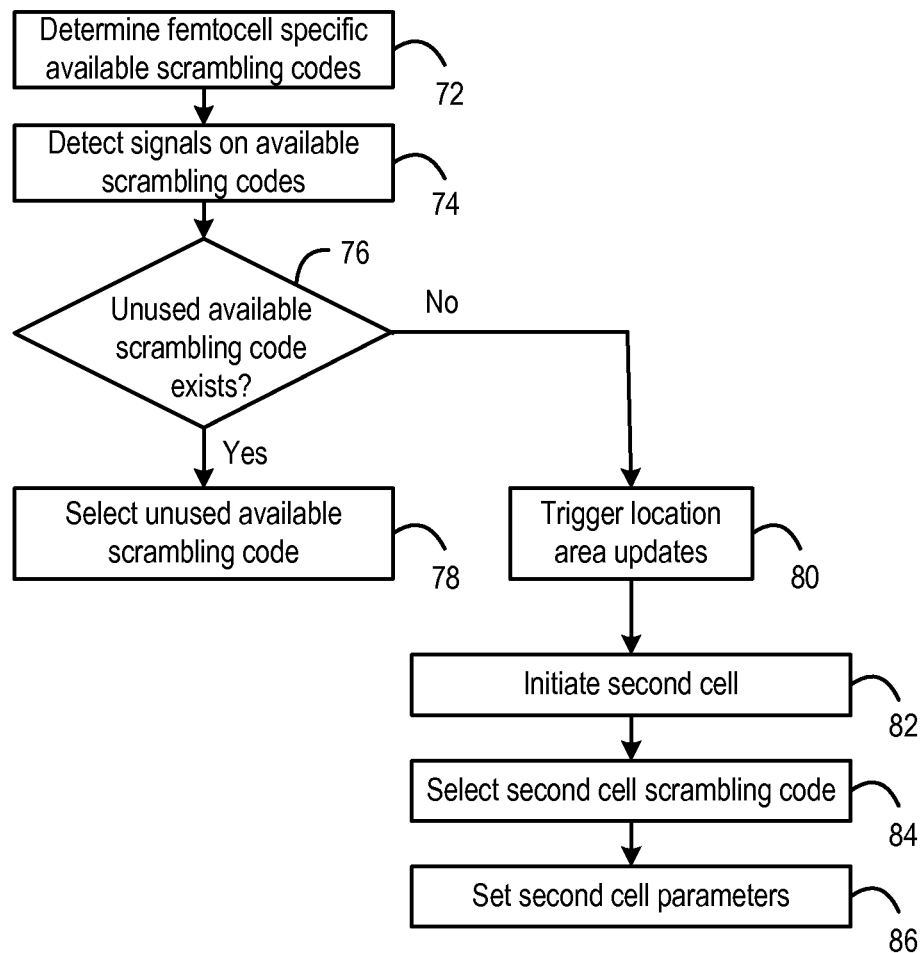
FIG. 2 is a flow chart, illustrating a method in accordance with an aspect of the present invention.

Located within the coverage area of the basestation 12 is a building 16 which, in this illustrated example, is divided into apartments or small offices 18, 20, 22, 24, 26, etc. Femtocell basestations 28, 30, 32 are provided within three of these premises. The femtocell basestations 28, 30, 32 are connected in to the core network owned by the mobile network operator, using the existing broadband internet connection of that property. FIG. 2 shows the connections of each of the femtocell basestations 28, 30, 32 to a management system (MS) 34 located within the mobile operator's core network.

As is known, the femtocell basestations 28, 30, 32 can provide coverage for registered user equipments located within their coverage area. The femtocell basestations are intended to provide coverage only within their respective premises, and so they operate at low power. However, the signals transmitted by the femtocell basestations 28, 30, 32 will inevitably be detected in adjoining premises. That is, signals transmitted by the femtocell basestation 30 will be detectable not only in the relevant premises 22, but also, at reduced signal levels, in the adjoining properties 18, 24, 26 at least.

This fact has implications for the operation of the femtocell basestations 28, 30, 32. It is intended that each femtocell basestation should as far as possible be self-configuring. That is, the customer should be able to connect the femtocell basestation to the internet, and to a power supply, and the femtocell basestation should then be able to configure itself, so that it is able to begin operation, without significant user intervention.

One of the operational features of a cellular basestation, in the case of a 3 G UMTS or other mobile network using Code Division Multiple Access (CDMA) to allow user equipments to communicate with the basestation, is the scrambling code used for transmissions. That is, multiple devices can transmit in the same area at the same time, and in the same frequency band, and their transmissions can still be distinguished from one another, provided that they use different scrambling codes.

Where the mobile network operator allocates a large enough number of different scrambling codes to be shared amongst the population of femtocell basestations, there is a high probability that the femtocell basestations can each select a scrambling code, and the femtocell basestations that are located close enough to each other that their transmissions could interfere with each other will be able to choose different scrambling codes.

However, where the network operator allocates only a small number of different scrambling codes to be shared amongst the population of femtocell basestations, there is a high probability that two femtocell basestations, located close enough to each other that their transmissions could interfere, will be forced to share a scrambling code.

FIG. 2 is a flow chart, illustrating a process performed on initializing a femtocell basestation, in order to detect when this latter situation occurs. The process will be described with reference to its use in the femtocell basestation 30, assuming that the femtocell basestations 28, 32 are already in operation, but it will be appreciated that the same process can be performed on initialization of any femtocell basestation.

In step 72, the femtocell basestation 30 determines the femtocell specific scrambling codes that are allowed in its area, that is, the scrambling codes that may be used by a femtocell basestation in that location. In one scenario, all of the femtocell basestations in a mobile operator's network may use a single scrambling code, or a small number of scrambling codes, and the femtocell basestation may therefore be preprogrammed with this information. In another scenario, the list of allowed scrambling codes may be received from the management system 34 of the mobile operator's core network. In another scenario, the femtocell basestation 30 may determine the allowed scrambling codes in its area from the signals transmitted by neighbouring macrocell basestations. Each femtocell basestation can operate in terminal mode. That is, it can detect signals transmitted by other basestations on the system downlink frequencies. In particular, in this example, the femtocell basestation 30 can detect signals transmitted by the macrocell basestations 12, 14. Amongst the signals transmitted by the macrocell basestations 12, 14 are signals identifying the carriers and scrambling codes that can be used by femtocell basestations within its coverage area, and the femtocell basestation can detect these signals, and can thus determine the scrambling codes that are allowed in that area from the information transmitted in the neighbour cell lists.

In step 74, the femtocell basestation 30, in terminal mode as described above, detects signals transmitted on these allowed femtocell specific scrambling codes.

In step 76, it is determined whether one of these allowed femtocell specific scrambling codes is currently unused, at least within the range which is likely to give rise to interference problems. For example, the femtocell basestation 30 may simply detect the Received Signal Code Power (RSCP) level on each of the allowed femtocell specific scrambling codes. If the RSCP level on one or more of the scrambling codes is below a threshold value, the process passes to step 78, and an algorithm is performed to select one of the unused scrambling codes (if there is more than one unused scrambling code). If the RSCP level on every one of the scrambling codes is above a threshold value, the process passes to step 80, in which steps are taken to ensure that a location area update is triggered when a user equipment roams from the coverage area of one femtocell to the coverage area of another femtocell, even when the femtocells have the same scrambling code.

One possibility at this stage is for the femtocell basestation 30 to detect the Master Information Block (MIB) value tags in the System Information Messages broadcast by the other femtocell basestations that are using the same scrambling code.

The MIB value tag may only be able to take values in the range of 1 . . . 8, and typically toggles between two values within that range, when the system information changes. Thus, the MIB value tag may toggle between 1 and 2, or between 3 and 4, or between 5 and 6, or between 7 and 8.

In step 80, the femtocell basestation 30 may set its own MIB value tag toggling range, based on the decoded MIB value tags broadcast by the other femtocell basestations that are using the same scrambling code. Specifically, it may set its own MIB value tag toggling range such that this differs from all of the decoded MIB value tags broadcast by the other femtocell basestations that are using the same scrambling code.

This has the result that, when a UE moves from the coverage area of one femtocell basestation to another femtocell basestation, it will detect a different MIB value tag, and hence will perform a location update, even if the two femtocells are using the same scrambling code.

Another possibility at this stage is to use a PLMN (Public Land Mobile Network) value that differs from the PLMN value used by the other femtocell basestations that are using the same scrambling code. The PLMN value is usually used to identify all of the basestations that are within the same network. However, setting a different PLMN value in the femtocell basestation 30 that is different from another femtocell basestation that is using the same scrambling code is another way of ensuring that, as a UE moves from the coverage area of the femtocell basestation 30 to the coverage area of that other femtocell basestation, it will perform a location update.

When the steps have been taken to ensure that the location update is performed, additional steps are preferably also performed, in order to reduce still further the possibility of interference between cells operating using the same scrambling code. Specifically, in step 82, the femtocell basestation initiates a procedure to set up a second cell. Thus, the femtocell basestation effectively establishes two cells that it will serve, having the same coverage area. The first of these cells uses the scrambling code that appears in the neighbour cell list of the nearby macrocell basestation, and is therefore the cell into which UEs can roam from the macrocell network. However, as discussed above, other nearby femtocells may also be using the same scrambling code. The second cell is allocated a different scrambling code, and this can be chosen to be different from the scrambling codes in use in other nearby femtocells, even if the nearby femtocell basestations have also established second cells in the same manner.

In step 84, the femtocell basestation 30 selects a scrambling code for its second cell. For example, if the femtocell basestation had previously discovered that there are scrambling codes that appear in a generic list of allowed scrambling codes for femtocell basestations, but are not available in that area, these may be candidates for the scrambling code for the second cell. In another scenario, one or more scrambling codes may be reserved specifically for this situation, and may be notified to the femtocell basestation 30 by the management system 34.

Where there is one or more such candidate scrambling code, the femtocell basestation 30 selects one of the candidate scrambling codes. This can be a random selection, or can be made specifically to avoid a clash with scrambling codes being used in nearby cells, by first detecting the scrambling codes being used by nearby cells.

In step 86, the femtocell basestation 30 sets the cell parameters for the second cell, and also in the first cell. Specifically, the cell reselection parameters are set so that any UE spends the minimum time possible on the first cell. In particular, the cell reselection parameters are set such that any UE that roams into the first cell will immediately (within a few seconds) reselect to the second cell, while any UE on the second cell will roam directly to the macrocell network as it moves out of the coverage area of the two cells.

There are at least two ways in which the two cells can be set up, one involving a Location Registration Update between the first and second cells, and one not involving a Location Registration Update. In the first case, the femtocell basestation would transmit separate control channels for the two cells. That is, it would transmit two P-CPICHs, P-CCPCHs, S-CCPCHs, AICHs and SCHs. The first group of control channels, relating to the first cell, would be on the primary scrambling code allocated to the femtocell population, while the second group of control channels, relating to the second cell, as well as the DPCH, HS-DSCH and HS-SCCH, and the PICH, would be allocated a second unique scrambling code. Thus, only the second cell would be required to transmit the PICH.

In this configuration, the femtocell basestation 30 could use a single random access channel (RACH) detector, in order to detect access attempts in both cells. For example, the RACH could alternate between the first and second cells during different access slots. This has the advantage of reducing the hardware demodulation requirements in the femtocell basestation 30 for this two cell approach.

The macro layer inter-frequency neighbour cell list would contain the single scrambling code for the femtocell population.

The femtocell basestation would use its terminal mode to listen for transmissions from surrounding basestations, and would select a unique scrambling code for the second cell, and would select two unique Location Area Codes (LACs) for the first cell and the second cell. Both the first cell and the second cell would have the same Mobile Network Code (MNC) and Mobile Country Code (MCC). The PLMN would be the same for both cells, and the home PLMN field would be set to false, and the LACs would be different in order to avoid the UE being barred from the PLMN.

In operation, the user (in idle mode) would roam onto the cell from the macrolayer with the single Primary Scrambling code allocated to the femtocell population and would complete a Location Registration/Update over RACH/FACH (S-CCPCH).

The UE would then as usual do a cell reselection, and, based on suitable values for the parameters Sintrasearch, Qqualmin, Qhysts2,s, Qoffset2s,n transmitted on the System Information Blocks (SIBs) of the first cell, there could be a strong bias to cause reselection of the second cell on roam-in.

Thus, a UE located within the coverage area of the first and second cells would have a high probability of being served by the second cell rather than the first cell. As the UE leaves the coverage area, that is, on roam-out, the cell reselection would take place directly from the second cell served by the femtocell basestation 30 to the macrolayer in the normal manner.

An advantage of this approach is that the UEs would only be on the common scrambling code for a short period of time and hence the possibility of interference between two cells transmitting with the same scrambling code is minimized.

In an alternative procedure, the second cell can be set up in such a way that no Location Registration Update is performed. In this case, the first cell is set up so that it performs a downlink broadcast only, that is, there is no signalling apart from BCH in P-CCPCH. The second cell therefore makes not attempt to decode RACH in the uplink.

The first cell transmits on the P-SCH, S-SCH, P-CPICH, and P-CCPCH channels, but does not need to transmit the S-CCPCH or AICH. The first and second cells may have an equivalent PLMN (i.e. a different mobile network code (MNC) and mobile country code (MCC) to the local macrolayer). In this case, the macrolayer basestation broadcasts the common primary scrambling code, i.e. the scrambling code used by the first cell, in its System Information Block SIB11. Meanwhile, the first cell only broadcasts the primary scrambling code of the second cell 2 in its System Information Block SIB11, and the system information heavily favours Cell 2 in terms of cell reselection. That is, as discussed above, the parameters Sintrasearch, Qqualmin, Qhysts2,s, Qoffset2s,n are set to strongly favour cell reselection from the first cell to the second cell.

Thus, the UE performs a cell reselection from the macro layer to the first cell in the normal fashion. A Location Update and a Routing Area Update are required, since this involves a change in the Location Area Code (LAC) and Routing Area Code (RAC).

As indicated above, the RACH preamble for a Location Update (LAU) and a Routing Area Update (RAU) is not acknowledged in the first cell.

The UE interprets this as an uplink failure, which therefore triggers a cell reselection, and the UE reselects to the second cell. When the UE is camped on the second cell, this cell does not broadcast the scrambling code of the first cell, and hence the UE is "trapped" on the second cell defined by the femtocell basestation.

In this description, it is mentioned that the cell reselection parameters on the first cell can be set so that this first cell is effectively made to be very unattractive to UEs. For example, the parameter Qqualmin can be set equal to 0, and the parameter Treselection can be set equal to 1. In this case, a LAU/RAU may never be attempted, and the UE may immediately reselect from the macrocell to the first cell and then to the second cell. The UE will spend only enough time on the first cell to pick up the CELL INFO LIST, which is advertising the second cell as the only neighbour. This method is applicable both for the case where the user was in idle mode and for the case where the user was in connected mode, before leaving the macrocell.

In this scenario, it is only necessary for the first cell to transmit the P-CPICH and P-CCPCH.

It may also be advantageous to use a single P-SCH shared between the first cell and the second cell, with the first cell not transmitting the S-SCH.

A further possibility is for the femtocell basestation 30, acting as the Radio Network Controller (RNC) for both the first cell and the second cell, to initiate a hard handover from the macrocell to the second cell, by generating a handover message, which substitutes the primary scrambling code for the second cell, relying on Physical Layer Synchronisation Method A (3 GPP specification 25.214 and 25.331 section 8.2.2.3, which states that: "The UE shall ( . . . ) be able to perform a hard handover and apply physical layer synchronisation procedure A as specified in [29], even if no prior UE measurements have been performed on the target cell and/or frequency." This method is applicable both for the case where the user was in idle mode and for the case where the user was in connected mode, before leaving the macrocell.

As is apparent from this discussion, the second cell is set up in such a way that any UE will spend only a short time on the first cell, using the scrambling code that is shared with a nearby femtocell, and so there is a low probability that the transmissions from the two cells using the shared scrambling code will be time aligned and thus interfere with each other.

It is also apparent that the introduction of a pilot cell (that is, the first cell, which is intended only to accept mobile devices as they roam in from the macrolayer, but is not intended to provide any service to any such devices for any significant period of time) results in additional interference in the downlink. Furthermore, the transmit power is being allocated to control channels that are only required for a short period of time. In general, the additional interference and loss of power do not significantly adversely affect those services with a high spreading gain (e.g. speech) but would affect the data throughput of high speed data services (e.g. HSDPA and Rel '99 DCH data services). In order to minimize the downlink interference, the pilot cell power could be made inversely proportional to the long term or short term Rel 99 DCH data channel power or HS-DSCH channel power. Alternatively the pilot cell could be activated only when DCH data services or HSDPA are not active. As a further alternative, the pilot cell could be switched on and off at regular time intervals to minimize the effects of interference.

There is thus described a system which allows multiple basestations to coexist, with each being allocated the same scrambling code, while reducing the possibility of interference between the transmissions from these basestations.

The invention claimed is:

1. A method for use in a basestation of a cellular communications network, the method comprising:
   identifying a desired scrambling code for use by the basestation, the desired scrambling code also being used by another nearby basestation;
   using the desired scrambling code in a first cell served by the basestation; and
   establishing a second cell also served by the basestation, using a second scrambling code.

2. A method as claimed in claim 1, comprising:
   setting cell reselection parameters such that any user equipment roaming into the first cell reselects to the second cell.

3. A method as claimed in claim 1 or 2, comprising:
   receiving from a management system a list comprising at least one allowed scrambling code for femtocell basestations; and
   detecting, in information broadcast by at least one macrocell basestation, at least one scrambling code available in an area containing the basestation;
   wherein the desired scrambling code is a scrambling code detected in information broadcast by the at least one macrocell basestation; and
   wherein the second scrambling code is on the list of scrambling codes received from the management system.

4. A method as claimed in claim 1, further comprising:
   setting a power of the first cell as a function of data service activity.

5. A method as claimed in claim 4, comprising setting the power of the first cell as an inverse function of a data channel power.

6. A method as claimed in claim 5, comprising setting the power of the first cell as an inverse function of a long term average data channel power.

7. A method as claimed in claim 4, comprising activating the first cell only when the data channel is not active.

8. A method as claimed in claim 1, further comprising:
   switching the first cell on and off at regular time intervals.

9. A method as claimed in claim 1, further comprising:
   using a single RACH demodulator in the first cell and in the second cell.

10. A method as claimed in claim 1, wherein the first cell transmits on only a subset of the channels on which the second cell transmits.

11. A method as claimed in claim 1, comprising establishing the basestation such that a location area update is triggered whenever a mobile communications device moves from a coverage area of the nearby basestation into a coverage area of said basestation.

12. A method as claimed in claim 11, wherein the step of establishing the basestation such that a location area update is triggered comprises selecting a MIB value tag for said basestation that differs from a MIB value tag of the nearby basestation.

13. A method as claimed in claim 11, wherein the step of establishing the basestation such that a location area update is triggered comprises setting a PLMN value for said basestation that differs from a PLMN value of the nearby basestation.

14. A basestation, for use in a cellular communications network, the basestation comprising:
   one or more interfaces for communicating with other entities in the cellular communications network;
   memory; and
   one or more processors, the one or more processors configured to
   identify a desired scrambling code for use by the basestation, the desired scrambling code also being used by another nearby basestation;
   use the desired scrambling code in a first cell served by the basestation; and
   establish a second cell also served by the basestation, using a second scrambling code.

15. A basestation as claimed in claim 14, the one or more processors further configured to:
   set cell reselection parameters such that any user equipment roaming into the first cell reselects to the second cell.

16. A basestation as claimed in claim 14, the one or more processors further configured to:
   set a power of the first cell as a function of data service activity.

17. A basestation as claimed in claim 16, the one or more processors further configured to:
   set the power of the first cell as an inverse function of a data channel power.

18. A basestation as claimed in claim 17, the one or more processors further configured to:
   set the power of the first cell as an inverse function of a long term average data channel power.

19. A basestation as claimed in claim 16, the one or more processors further configured to:
   activate the first cell only when the data channel is not active.

20. A basestation as claimed in claim 14, the one or more processors further configured to:
   switch the first cell on and off at regular time intervals.

21. A basestation as claimed in claim 14, the one or more processors further configured to:
   use a single RACH demodulator in the first cell and in the second cell.

22. A basestation as claimed in claim 14, wherein the first cell transmits on only a subset of the channels on which the second cell transmits.

23. A basestation as claimed in claim 14, the one or more processors further configured to:
   establish the basestation such that a location area update is triggered whenever a mobile communications device moves from a coverage area of the nearby basestation into a coverage area of said basestation.

24. A basestation as claimed in claim 23, wherein the step of establishing the basestation such that a location area update is triggered comprises selecting a MIB value tag for said basestation that differs from a MIB value tag of the nearby basestation.

25. A basestation as claimed in claim 23, wherein the step of establishing the basestation such that a location area update is triggered comprises setting a PLMN value for said basestation that differs from a PLMN value of the nearby basestation.

* * * * *